US008510828B1

(12) United States Patent
Guo et al.

(10) Patent No.: US 8,510,828 B1
(45) Date of Patent: Aug. 13, 2013

(54) ENFORCING THE EXECUTION EXCEPTION TO PREVENT PACKERS FROM EVADING THE SCANNING OF DYNAMICALLY CREATED CODE (75) Inventors: Fanglu Guo, Los Angeles, CA (US); Tzi-cker Chiueh, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 1406 days.

(21) Appl. No.: 11/967,529

(22) Filed: Dec. 31, 2007

(51) Int. Cl.
*H04L 29/06* (2006.01)

(52) U.S. Cl.
USPC .......... 726/22; 726/1; 726/23; 713/182; 717/127; 717/136; 717/162; 717/174

(58) Field of Classification Search
USPC .......................................................... 726/22
See application file for complete search history.

(56) References Cited

U.S. PATENT DOCUMENTS

| 7,296,274 | B2 | 11/2007 | Cohen et al. | |
| 7,836,504 | B2* | 11/2010 | Ray et al. | 726/24 |
| 2005/0172337 | A1 | 8/2005 | Bodorin et al. | |
| 2006/0174319 | A1 | 8/2006 | Kraemer et al. | |
| 2007/0106981 | A1 | 5/2007 | Bird | |
| 2008/0040710 | A1 | 2/2008 | Chiriac | |
| 2008/0229416 | A1 | 9/2008 | Stewart et al. | |
| 2009/0049550 | A1* | 2/2009 | Shevchenko | 726/23 |

FOREIGN PATENT DOCUMENTS

WO WO 2007/071999 A1 6/2007

OTHER PUBLICATIONS

Kevin A. Roundy and Barton P. Miller, "Hybrid Analysis and Control of Malware," Recent Advances in Intrusion Detection Lecture Notes in Computer Science, vol. 6307, 2010, pp. 317-338.*
Adrian Stepan, *Improving proactive detection of packed malware*, [online], 2006, retrieved from the URL:<http://www.virusbtn.com/virusbulletin/archive/2006/03/vb200603-pa . . . >.
*Blackhat USA 2007*, Black Hat USA 2007 Topics and Speakers, [online], 2007, retrieved from the URL:<http://www.blackhat.com/html/bh-usa-07-speakers.html#Qu . . . >.
Joe Stewart, *Unpacking with OllyBonE*, [online], Jan. 3, 2007, retrieved from the URL:<http://www.joestewart.org/ollybone/tutorial.html>.

* cited by examiner

*Primary Examiner* — Taghi Arani
*Assistant Examiner* — Narciso Victoria
(74) *Attorney, Agent, or Firm* — Fenwick & West LLP (57) ABSTRACT

To detect possible malicious code that is unpacked at runtime before it is executed, antivirus software requires that any dynamically created code be scanned before it can be executed by a host computer system. This requirement may be enforced by requiring memory pages to be either executable or writable, but not both. Before changing from writable but not executable to executable but not writable, the page is scanned for malicious code. To prevent packers from evading this scanning, the software may enforce the execution exception to prevent packers from changing whether a page is executable and thereby evading the scanning of dynamically created code. The software may also include exception handlers to allow a program to write to a page that contains the code being executed, but also limit such an operation (e.g., to a single step) to avoid evasion of the antivirus software.

19 Claims, 8 Drawing Sheets

ENFORCING THE EXECUTION EXCEPTION TO PREVENT PACKERS FROM EVADING THE SCANNING OF DYNAMICALLY CREATED CODE

CROSS REFERENCE TO RELATED APPLICATIONS

This application is related to U.S. application Ser. No. 11/960,426, filed Dec. 19, 2007, which is incorporated by reference in its entirety.

BACKGROUND

This invention relates generally to antivirus software for detecting malicious code, and in particular to preventing packers from evading the scanning of their dynamically created malicious code.

Computer systems are continually threatened by a risk of attack from malicious computer code or malware, code that enters a computer without an authorized user's knowledge and/or without an authorized user's consent, such as a virus, a worm, or a Trojan horse. Antivirus prevention/detection software can be installed on computers in an attempt to prevent malicious code attacks and to detect the presence of malicious code, by e.g., using signature detection methods. However, as malware evolves, the antivirus software too has to evolve to keep up with the latest malware.

Signature-based malware detection methods currently face a serious problem with an antivirus detection evasion tool called a "packer." A packer is a tool that is used to take an existing piece of malware and hide or "pack" it to make it no longer detectable to most signature-based detection systems. A packer can change the byte-level appearance of a binary program without modifying its execution semantics. Because signatures used in anti-virus (AV) scanning engines are derived from the byte-level representations of malware samples, malware writers use packers to hide the malware program by changing its appearance. Even worse, malware writers can also apply different packers in different combinations to create a large number of variants of existing malware that can easily evade signature-based AV scanners.

Traditionally, AV companies have attempted to manage the packer problem by manually reverse-engineering popular packers and creating unpackers for them. Once an unpacker for a packer X is available, an AV scan engine can unpack binaries packed by X and can apply the standard scanning method on the unpacked malware. Unfortunately, there are a very large number of different packers; more than 1000 different packers are currently known. Thus, reverse-engineering each of these different packers is an impossible proposition because it is a slow and expensive process. AV companies can commonly deal with no more than 100 packers. Worst yet, packers are constantly evolving because the source code of some packers is available on the Internet for anyone to customize and tweak for evasion purposes. As a result, AV companies always lag behind the rate at which new packers are developed, and the detection rate of all AV engines on the market has fallen dramatically.

There are a number of shortcomings with each technique that has been used by AV companies to solve the packer problem. For example, one generic unpacking technique called "emulation" emulates each instruction of the unpacking code in a virtual system, but this emulation process can be very slow and requires large amounts of virtual memory, among other problems. Another generic unpacking technique called "dynamic translation" translates the program's code blocks to native code, which helps improve the speed of emulation, but this often fails to run correctly because it requires modification of the code and packers often check the integrity of the code. There are also tools for dealing with packers by manually marking potential address space as non-executable. Whenever the program wants to execute code in that address space, these tools can transfer control to a debugger for human being to take a look at it if the program is unpacked. However, these tools are not automated, are slow, intrusive, and require use of a debugger. Another method tracks memory write and memory execution by incrementing the code, but this requires modifying the code and thus also does not work for packers which check the integrity of the code. None of these methods provides an automated, fast, non-intrusive, and effective solution to this cross-the-industry problem of dealing with malware packed by one or more arbitrary packers.

SUMMARY

To detect malicious code that is dynamically created (i.e., created at runtime), e.g., by a packer, antivirus software may require dynamically created code to be scanned before it can be executed by a host computer system. This may be enforced, for example, by enforcing a mutual exclusion requirement so that a memory page may be either executable or writable, but not both. When code on a particular page that is marked as not executable needs to be executed, the antivirus software first scans the memory page of malicious code, and if no malicious code is found, the page is marked as executable but not writable. While this general technique of preventing dynamic code from being executed before it is scanned may catch simple packers, more sophisticated packers may employ evasion techniques to avoid detection. Embodiments of the invention anticipate some of these evasion techniques and apply countermeasures to render those evasion techniques ineffective.

To prevent packers from evading the scanning techniques described herein, in one embodiment of the invention, antivirus software enforces a mutual exclusion requirement that memory pages be either executable or writable, but not both. Before changing from writable but not executable to executable but not writable, a memory page is scanned for malicious code. To prevent packers from evading this scanning, the software may enforce the execution exception to prevent packers from changing whether a page is executable and thereby evading the scanning of dynamically created code. The software may also include exception handlers to allow a program to write to a page that contains the code being executed, but also limit such an operation (e.g., to a single step) to avoid evasion of the antivirus software.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Scanning Dynamically Created Code

A "packer" is a program that can compress or encrypt an input executable (e.g. a binary file) into another executable that is different at the binary level. As an example of a typical packing process, a packer P reads in the byte sequence of the input binary O and compresses or encrypts this byte sequence into another byte sequence called O', and adds an unpacker routine U to O' to form the final packer output, P(O). When P(O) runs, the program's control first goes to the unpacker routine U. If AV scanning is performed on P(O) at this point, the scan will not detect the underlying malware program O as it is disguised by the packer. The unpacker routine U decompresses/decrypts O' and restores the original program O in memory. Then, control is transferred to the main entry point of O as if the unpacking process never took place. Because P(O) is substantially different from O, the byte-level signature for O is not applicable to P(O). The AV engine fails to detect P(O) as malware, even if it behaves the same as O. Once the unpacking occurs, the execution of malware O can occur without detection as any AV scan that might have occurred would have occurred upon initial execution of P(O) and so would have already missed the malware. Malware writers can pack a piece of malware O with different packers and generate different variants such as P1(O), P2(O), etc. In addition, they can apply packing multiple times to a malware O and generate such variants as P1(P2(O)), P2(P1(O)), and so on. By applying multi-layer packing, even with a small number of packers, malware writers can easily generate a large number of variants from the same malware. If an AV scanner can successfully unpack arbitrarily packed binaries, only one signature is needed per malware; otherwise it needs to create a signature per variant per malware.

Figure 1A:
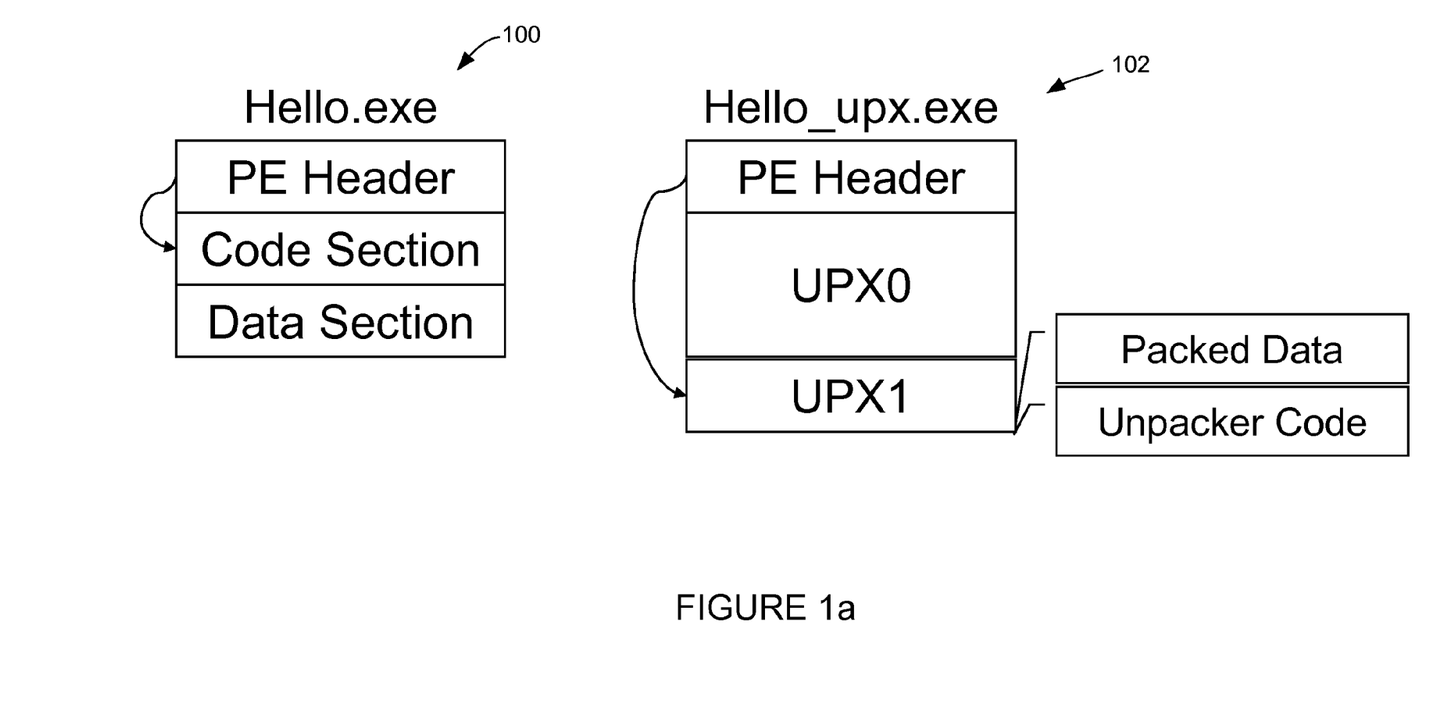
FIG. 1a is a high-level block diagram illustrating an example of the components of a program and a packed program.

FIG. 1a illustrates an executable program (Hello.exe 100) and illustrates that executable packed by a common packer UPX (Hello_upx.exe 102). The Hello.exe shows the standard PE header, code section, and data section that can be found in an executable program. The memory range of Hello.exe's 100 code and data sections is reserved as section UPX0 in the packed version, Hello_upx.exe 102. Data in Hello.exe's 100 code section and data section are compressed and stored in UPX1 as packed data. Unpacker code is added in UPX1 to restore Hello.exe's 100 code section and data section to UPX0 from the packed data in UPX1. The entry point of Hello_upx.exe 102 is modified to point to the unpacker code, and so the first action will be to unpack the program and restore the original binary in memory. Control will then be transferred to the original binary. The original malware is completely unpacked before control is transferred to it. Unpacking and execution are not interleaved and code pages stay in plaintext form simultaneously. The malware's post-load address space image remains the same.

Returning again to the prior example, when a packed binary P(O) runs, its unpacker routine restores the original program being packed, O, in memory at some point in time. In brief summary, the system described here functions by accurately catching this moment and invoking the AV scanner at that point so that existing AV scanning technology can be applied to P(O) as effectively as to O. In addition, the system can catch this unpacking moment in a way that is independent of the packing algorithms used in packers so this approach can be applied to P(O) regardless of the underlying packing techniques used in P.

The packing manager system described here manages the packer problem using an automated method that allows existing AV scanning technology to be applied to detect known malware samples packed by one or more packers that are potentially proprietary. Because there is no obvious difference between an unpacker routine and a binary that is packed, detecting the end of unpacking is non-trivial, and being able to do so in a way independent of the particular packer used is even more challenging. Regardless of the packer used, the unpacker routine in a packed binary at some point creates the original program being packed at run time and transfers control to it. So, during the execution of a packed binary, the code pages associated with the original program must be dynamically generated and later on executed. By catching control transfers to dynamically written pages, the system described here can catch the moment when the original program is restored.

Figure 1B:
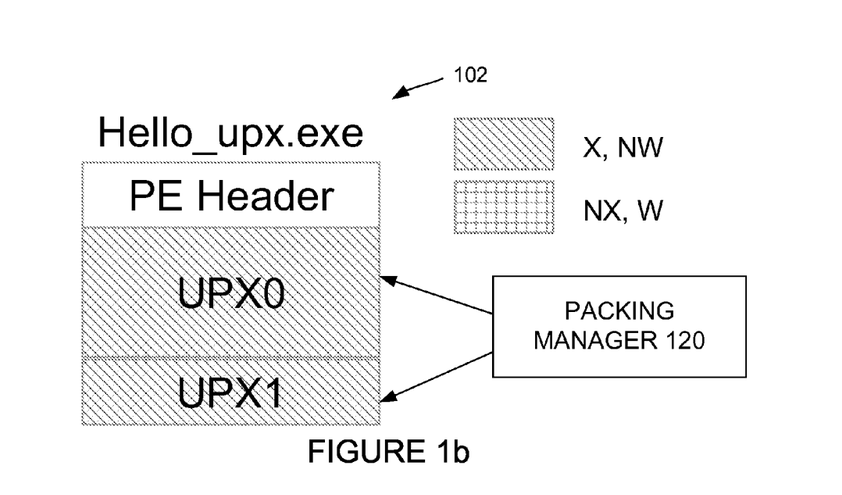
FIG. 1b is a high-level block diagram illustrating an example of the components a packed program illustrating changes to memory protection settings, in accordance with one embodiment of the invention.
Figure 1C:
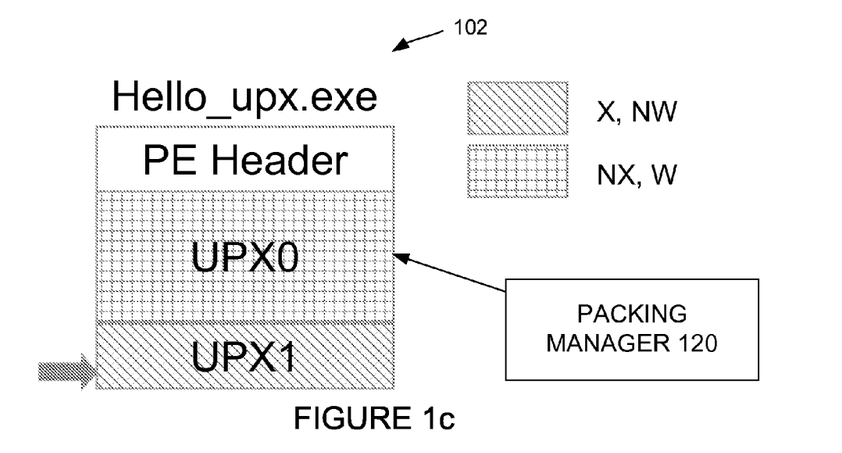
FIG. 1c is a high-level block diagram illustrating an example of the components a packed program illustrating changes to memory protection settings, in accordance with one embodiment of the invention.

The detection of control transfers to dynamically written pages by the packing manager system can be performed in different ways. In one embodiment, to reduce the performance overhead associated with the detection of control transfers to dynamically written pages, the packing manager system leverages the virtual memory protection hardware in modern CPUs (such as X86) to track pages that are written and executed. A brief summary of how this embodiment can function is provided here with regard to FIGS. 1b, 1c, and 1d, as one example of the overall system. More specifically, before an executable binary is executed in this embodiment, the packing manager system 120 marks its memory pages as non-writable but executable. FIG. 1b illustrates this by showing Hello_upx.exe 102 from FIG. 1a, with its sections UPX0 and UPX1 marked by the system as non-writable (NW) but executable (X), as illustrating by the shading in FIG. 1b. When the unpacker starts restoring the original program, it will write to non-writable pages (marked NW by the packing manager) and will cause a write access violation exception for the first write to each such page. This is illustrated in FIG. 1c where the unpacker code of Hello_upx.exe 102 derives the original program from packed data and writes it to pages in UPX0. The virtual memory hardware automatically detects the write exception and the operating system delivers this exception to the user process. The packing manager 120 intercepts and handles each such exception by marking the associated page as writable but non-executable and resuming the execution so that the unpacker can continue restoring the original program. FIG. 1c illustrates this by showing UPX0 of Hello_upx.exe 102 with different shading now that represents writable (W) but not executable (NX).

Figure 1D:
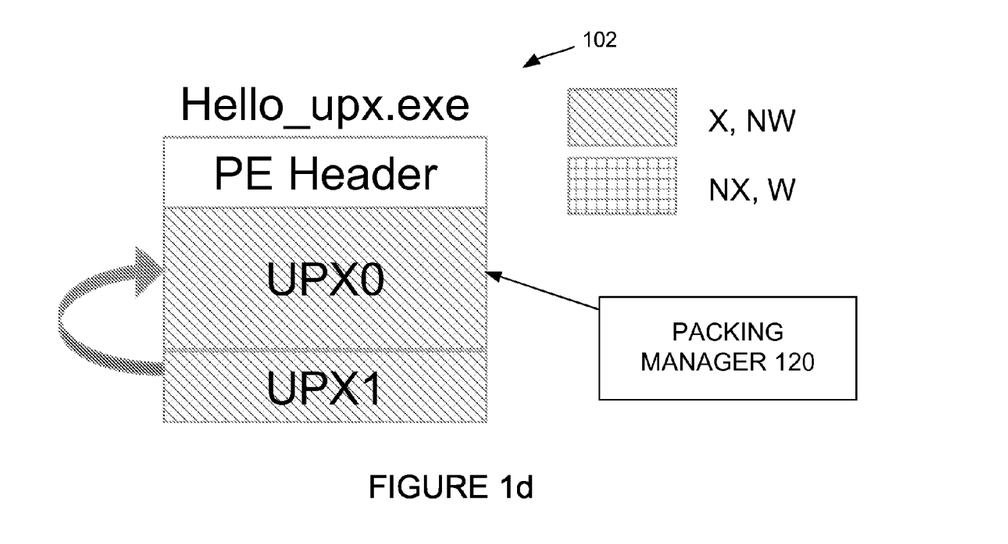
FIG. 1d is a high-level block diagram illustrating an example of the components a packed program illustrating changes to memory protection settings, in accordance with one embodiment of the invention.

After the unpacker fully restores the original program, it transfers control to the entry-point (the first instruction) of the original program. The virtual memory hardware detects an execution exception because that page is writable but not executable. The operating system again delivers this exception to the user process. The packing manager 120 catches this exception and calls AV scanner to scan the address space snapshot at this point. For example, the system can dump the process's address space image for an AV scanner to scan. If the AV scanner detects malware, the packing manager 120 terminates the process. If the AV scanner does not find any match based on a virus signature scan of the dumped image, the packing manager 120 changes the pages to executable and non-writable. The program can thus continue execution without problem. FIG. 1d illustrates this by showing that the shading of UPX0 of Hello_upx.exe 102 has changed to now be executable (X) but not writable (NW). This embodiment of the packing manager 120 can be executed in hardware, software, or both.

In this embodiment, the packing manager 120 is generic because the way it tracks the code pages of the original programs does not require any packer-specific knowledge. Moreover, it is also fully automated because no human intervention is needed. Finally, it is efficient because page status tracking can be done transparently by virtual memory hardware, and thus does not incur any software overhead. However, in other implementations of the packing manager 120, it does not rely on virtual memory hardware. For example, the packing manager 120 can instead run in an emulator that looks at each instruction to determine if any instruction has been modified. In each implementation, however, the packing manager 120 detects the control transfer to a dynamically generated page.

The packing manager system 120 can deal with multiple-layer packed binaries equally effectively without any modification. Since each layer of packer exhibits the same behavior, executing dynamically generated code, each layer will be unpacked in the reverse order of their packing sequence. If the latest unpacking round is not the last round, its output is an intermediate packed binary that needs to be unpacked. In this case, the program resumes and the packing manager 120 continues to track pages that are dynamically generated and executed. Finally the original program is restored and unpacking comes to the last round. The original program is scanned before execution, and will be prevented from executing if the AV scanner determines it to be malware.

As used herein, the term "AV scanner," "AV program," "AV engine," and the like can include any type of computer security or anti-malicious code prevention or detection software located on a client computer, server, or networked computer, including e.g., signature scanners, behavior blockers, intrusion detection scanners, etc. The term, "unpacking," as used here includes unpacking, unencrypting, descrambling, de-obfuscating, etc. An "exception," as used herein is a signal generated when a program attempts to write to a non-writable page or to execute a non-executable page, or it can be a hardware interrupt, a software signal, etc.

Figure 2:
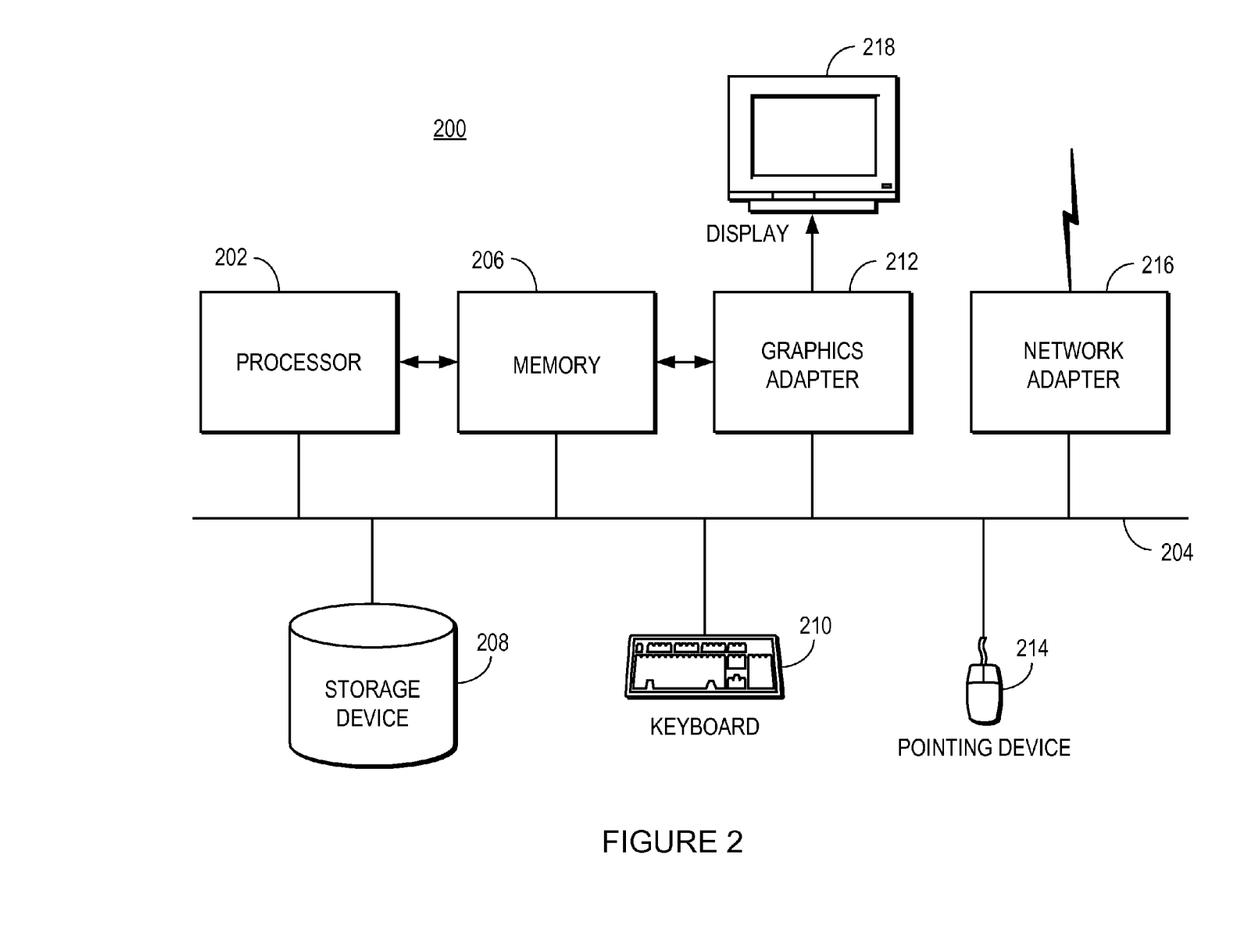
FIG. 2 is a high-level block diagram illustrating a standard computer system 200 for use with an embodiment.

FIG. 2 is a high-level block diagram illustrating a functional view of a typical computer system 200 for storing and executing the packing manager system, according to one embodiment of the present invention. This computer system 200 can act as a client computer 110, as shown in FIG. 1. However, one or more of the components of the computer system 200 may be missing or modified in the client computer 110. Illustrated is a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86, SUN MICROSYSTEMS SPARC, or POWERPC compatible-CPU, or the processor 202 may also be a custom-built processor. The memory 206 may be, for example, firmware, read-only memory (ROM), non-volatile random access memory (NVRAM), and/or RAM, virtual memory, memory-mapped or disk-based memory storage, etc., and holds instructions and data used by the processor 202. The storage device 208 is, in one embodiment, a hard disk drive but can also be any other device capable of storing data, such as a writeable compact disk (CD) or DVD, and/or a solid-state memory device. The pointing device 214 may be a mouse, track ball, or other type of pointing device, and is used in combination with the keyboard 210 to input data into the computer system 200. The graphics adapter 212 displays images and other information on the display 218. The network adapter 216 couples the client computer 110 with the Internet 112.

As is known in the art, the computer system 200 is adapted to execute computer program modules for providing functionality described herein. In this description, the term "module" or "manager" refers to computer program logic for providing the specified functionality. A module/manager can be implemented in hardware, firmware, and/or software. Where the any of the modules/managers described herein are implemented as software, the module/manager can be implemented as a standalone program, but can also be implemented in other ways, for example as part of a larger program, as a plurality of separate programs, or as one or more statically or dynamically linked libraries. It will be understood that the modules/managers described herein represent one embodiment of the present invention. Certain embodiments may include other modules/managers. In addition, the embodiments may lack modules described herein and/or distribute the described functionality among the modules/managers in a different manner. Additionally, the functionalities attributed to more than one module/manager can be incorporated into a single module. In one embodiment of the present invention, the modules/managers are stored on the storage device 208, loaded into the memory 206, and executed by the processor 202. Alternatively, hardware or software modules/managers may be stored elsewhere within the computer system 200. Similarly, a computer program product comprising a computer-readable medium (e.g., a CD-ROM, a tape, a DVD, memory, flash memory, etc.) containing computer program code for performing functionalities described here is contemplated.

Figure 3:
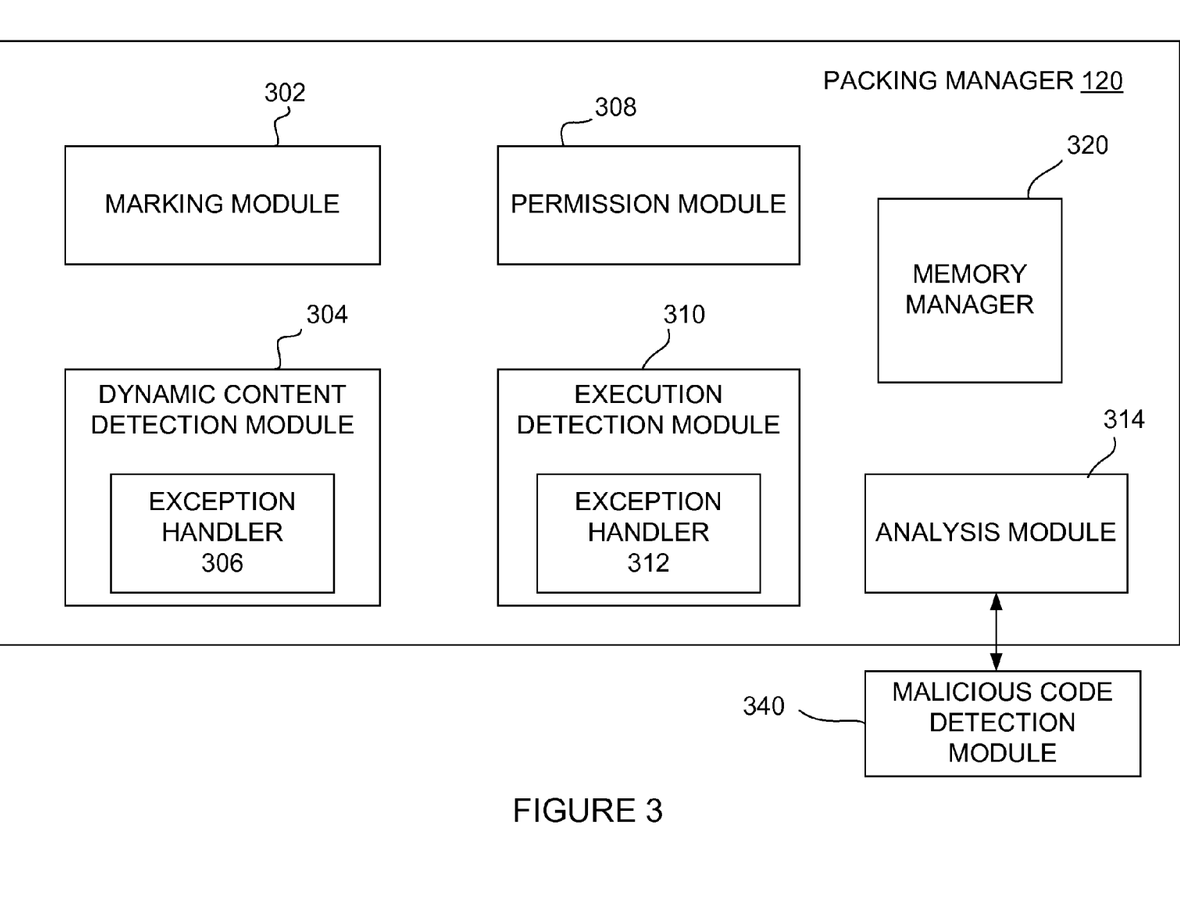
FIG. 3 is a high-level block diagram illustrating the functional modules within the packing manager 120, in accordance with one embodiment of the invention.

FIG. 3 is a high-level block diagram illustrating the functional modules within the packing manager 120, according to one embodiment of the present invention. The packing manager 120, in the embodiment illustrated in FIG. 3, includes a marking module 302, a dynamic content detection module 304 having an exception handler 306, a permission module 308, an execution detection module 310 having an exception handler 312, an analysis module 314, and a memory manager 320. FIG. 3 also illustrates a malicious code detection module 340, as described below. Those of skill in the art will recognize that other embodiments can have different and/or additional modules than those shown in FIG. 3 and the other figures. Likewise, the functionalities can be distributed among the modules in a manner different than described herein. When describing the embodiments of the invention below, the examples frequently focus on the virtual memory hardware embodiment as an example of how the packing manager 120 can function. However, throughout the specification, the examples used also apply to the other embodiments of the packing manager 120, as previously described.

In some embodiments, the packing manager 120 logic is first injected into a process, and the packing manager state is initialized. This injection can occur in various ways. For example, the packing manager 120 logic can be implemented as a dynamic-link library (DLL). When the process is created, the packing manager DLL is injected into the process. There are several well-known technologies to achieve this goal. The advantage of this approach is that it is easy to make the code reliable and portable to different versions of operating systems. Another approach is to implement the packing manager 120 logic in an operating system kernel, such as WINDOWS® Kernel. Thus, any process will be automatically tracked by the kernel packing manager 120 code. The advantage of this approach is that the packing manager 120 can be stealthier. One disadvantage regarding the WINDOWS® Operating System, for example, is that it is hard to port to WINDOWS® for x64 platform because of the patchguard.

Once the packing manager 120 logic is injected, it can perform various processes. For example, the marking module 302 of the packing manager 120 can perform an initialization that includes first contacting the memory manager 320 to find the address space where the program or target process is loaded and recording the original protection setting of the memory pages in this address space. As used herein, the term "memory page" is a block of memory as defined by a memory manager, a memory management unit in a processor, a virtual memory management system, a virtual machine memory manager, or another hardware or software predefined region of memory. The memory manager can be implemented in hardware, software, or both. In some embodiments, the memory manager is virtual memory protection hardware, such as that present in modern CPUs (e.g., X86), which can be used to track pages that are written to and executed.

In some embodiments, the marking module 302 then initially marks these memory pages where the program is loaded as executable but not writable prior to any detection by the module 302 (as also illustrated in FIG. 1b). If the program is malware packed by a packer, it will first need to unpack the malware by writing it to one or more of the memory pages. However, because the marking module 302 initialized the memory pages to be non-writable, when the unpacker routine starts restoring the original program, it will write to the non-writable pages, as marked by the marking module 302, and it will thus cause a write access violation exception for the first write to any such marked page. If the page(s) are already marked not writable, but executable, this marking by module 302 can be skipped.

The dynamic content detection module 304 of the packing manager 120, for example, can detect an attempt by a program to dynamically generate content to a memory page, wherein the program is suspected to be unpacking malicious executable code to the memory page. The module 304 can perform the detection in various manners. In one embodiment, the module 304 includes an exception handler 306 that can intercept and handle a first exception generated by the memory manager 320 when the program attempts to dynamically generate content to the memory page set to be executable but not writable by the marking module 302. When the write access violation described above occurs because the program wrote to a non-writable page, the exception handler 306 catches an exception generated by the memory manager 320 so the packing manager 120 can intercept and handle the exception.

The marking module 302 marks the memory page to which the program attempted to dynamically generate content, as detected by the module 304. In one embodiment, the marking module 302 handles the exception generated by the exception handler 306 by doing this marking of the memory page. More specifically, in this embodiment, the marking module 302 handles the exception by marking the memory page to which the program attempted to write as writable but not executable. Thus, the program can continue its writing because the page is now marked writable again without the program even necessarily realizing that there was any sort of exception generated. If the program is packed malware, the unpacker can continue its unpacking of the original malware program. In some embodiments, the marking module 302 marks the memory page by tracking or recording the page to which the program attempted to dynamically generate content.

The permission module 308 allows the program to dynamically generate the content to the memory page until the program attempts to execute code stored on the memory page. As explained above, the marking module 302 switches each page to which the program is attempting to write from non-writable but executable to writable but not executable upon the first attempt by the program to write to that page. Once this occurs, the module 308 allows the program to continue its writing to the one or more memory pages. For the writeable, non-executable memory pages, no further action need by taken by the packing manager 120 until execution occurs because the module 308 will ensure that the program can continue to dynamically generate content for writeable, non-executable pages until the program makes an attempt at execution. Thus, the packing manager 120 does not need to interfere with or otherwise slow the dynamic generation of content by the program on the writeable, non-executable memory pages. The packing manager 120 further does not need to waste resources monitoring this dynamic generation of content since the memory pages to which the writing is occurring are marked non-executable. In this manner, the packing manager 120 has ensured that, whatever happens in the meantime, the program cannot execute dynamically generated code without the packing manager 120 first being notified. In some embodiments, if the program attempts to write to another memory page, and exception is again generated by the memory manager 320 since the page is still marked as non-writeable but executable (as marked initially).

The execution detection module 310 detects an attempt by the program to execute the code stored in the memory page, the detection occurring before the execution occurs. The module 310 can perform the detection in various manners. In one embodiment, the module 310 includes an exception handler 312 for intercepting and handling a second exception generated by the memory manager 320 upon detection of the attempt by the program to execute the code. If the program is packed malware, after the unpacker fully restores the original program, it will transfer control to the program's entry-point. However, when the program attempts to execute, this will cause an execution access violation exception inside the memory manager 320 because the pages are marked writable but not executable. The exception generated is caught by the exception handler 312. Specifically, the page is marked non-executable because its content is dynamically generated, and the dynamic generation was detected originally by the detection module 304, and then the page was marked as non-executable by the marking module 302.

The exception handler 312 can work in the same manner as the exception handler 306, and in some embodiments, they are both included in one exception handler. The exception handler can also be a standalone module. These exception handlers thus can enforce write and execution in a mutually exclusive manner so that any execution of dynamically generated code will be caught. The following is an example of pseudo code that might be implemented in the exception handlers 306, 312.

```
{
    if write exception
        change page to be writable but not executable
    if execution exception
        dump the memory image of the target process
        scan the dumped file
        if malware
            terminate the process
        else
            change the page to be executable
    if others
        pass the exception to the program
}
```

The analysis module 314 provides to a malicious code detection module 340 the memory page for analysis for the presence of malicious code. In providing the memory page, for example, the analysis module 314 can provide a descriptor such as the memory address location of the page or a pointer to the page, a dump or copy of the contents of the page, execute a callback function on the memory page from the malicious code detection module, an in-memory portable executable (PE) file, etc. For example, the analysis module 314 can present a file that is already in memory to module 340, and since it is already in memory, there is no need to dump it out to disk for module 340 to read from disk to memory again. Thus, the file is presented in an efficient and convenient manner to module 340.

The malicious code detection module 340 can be an AV scanner for scanning the program for the presence of malicious code. In FIG. 3, the malicious code detection module 340 is shown as separate from the packing manager 120, but it could also be included partially or entirely within the packing manager 120. In some embodiments, at each execution access violation exception, the analysis module 314 dumps the process's address space image for an AV scanner to scan for malware. In some embodiments, the AV scanner uses standard virus signature detection methods known in the art to scan the program to determine if a known virus signature is contained in the program. If the AV scanner does not find any match in the dumped image, the program is permitted to continue its execution without further interruption. However, if the AV scanner/detection module 340 detects malware, then appropriate action can be taken to prevent this malware from executing and infecting or otherwise harming the computer. For example, the malware can be quarantined for further examination, the user can be notified that malware was detected, etc. In some embodiments, the module 314 provides only the one or more memory pages to which the program dynamically generated content and then attempted to execute.

In some embodiments, the program is packed by multiple layers of packers, and these can be different, arbitrary packers, some of which may be proprietary packers or packers that were not previously known or seen before by computer security companies (e.g., for which antivirus signatures are not currently available). For each layer of packing, the modules described above can repeat the steps. For example, a first layer of unpacking may only unpack a program that is still packed by one or more further layers of packers. Thus, when there is an attempt to execute this program that is still packed (e.g., control is first transferred to the pages whose content are dynamically generated), the analysis module 314 can provide these pages for scanning. Since the original program is still packed by one or more packers, the scanner may or may not detect that there is malware contained, depending on whether or not there is a signature available for that packer that was unpacked. If there is determined not to be malicious code in that layer that was unpacked, the unpacking process can continue, resulting in another layer being unpacked. Again, there is detection of the end of the unpacking, and before execution of the unpacked code occurs a scan can be performed. These steps performed by the modules above can be repeated until eventually the last layer of unpacking occurs, and the original program is unpacked. The packing manager 120 again detects the point in the unpacking process when the program attempts to execute the memory page with dynamically generated content. If this original program contains malicious code, the analysis of the memory page performed by the malicious code detection module will likely detect it because the memory page now contains unpacked malicious code, and thus the malicious code will be caught before execution and can be prevented from harming the computer.

Figure 4:
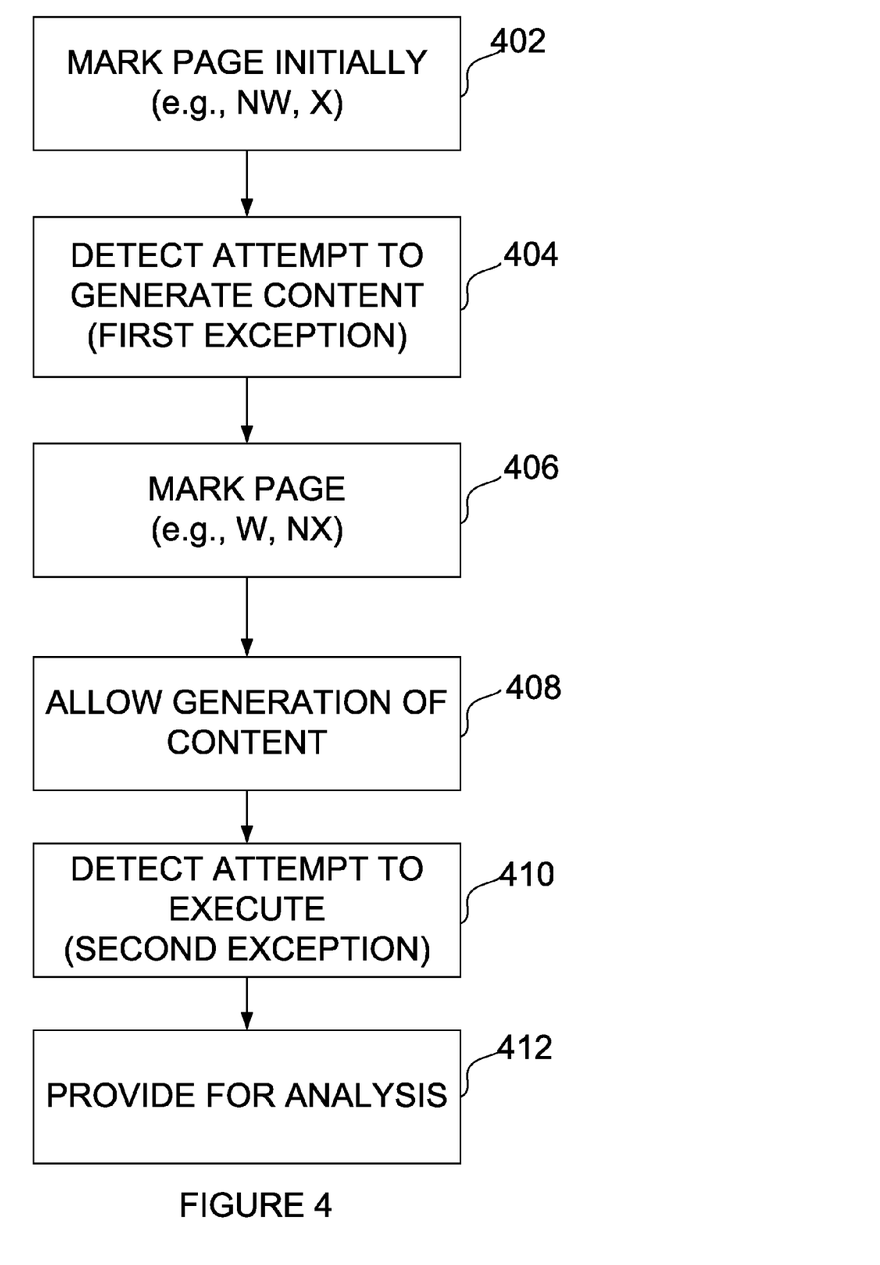
FIG. 4 is a flowchart illustrating steps performed by the packing manager, in accordance with one embodiment of the invention.

Referring now to FIG. 4, there is shown a flowchart illustrating the operation of the packing manager 120, according to some embodiments of the present invention. Different embodiments of the packing manager 120 may perform the illustrated steps in different orders, omit certain steps, and/or perform additional steps not shown in FIG. 4.

As shown in FIG. 4, in some embodiments, the packing manager 120 initially marks 402 the memory page as executable but not writable. As explained above, the packing manager 120 can find the address space where the program or target process is loaded and can record the original protection setting of the memory pages in this address space. If the memory pages are initially set to executable and writable, the packing manager can change these protection settings by marking each of the memory pages as executable but not writable.

The packing manager 120 detects 404 an attempt by the program to dynamically generate content to a memory page. The packing manager 120 can perform its overall method on any program on a computer, but especially if program is suspected to be unpacking malicious executable code to the memory page. The packing manager 120 performs this detection 404, in some embodiments, when a first exception generated. Specifically, an exception or interrupt can be generated when the program attempts to dynamically generate the content to the memory page since the page was previously set to be executable but not writable by the packing manager 120 (or was already initially set to be non-writable, in which case the packing manager 120 did not need to reset the page).

The packing manager 120 marks 406 the memory page to which the program attempted to dynamically generate content. In some embodiments, this marking occurs in response to the write access violation that occurs when the program attempts to write to the non-writable pages. As explained above, an exception can be generated by a memory manager, and the packing manager 120 intercepts and handles the exception. One way in which the packing manager 120 handles this exception is by marking 406 the memory page as writeable but not executable. Specifically, the packing manager 120 can switch the page that is currently marked as executable but not writeable to writeable but not executable. The packing manager 120 can thus allow 408 the program to dynamically generate the content to the memory page until the program attempts to execute code stored on the memory page. The program can now continue to write to the page without causing further write access violations since the page is now writeable. However, since the page was switched to non-executable, the program will not generate any further access violations until it attempts to execute. If the program attempts to write to another page, steps 404, 406, and 408 can be repeated.

The packing manager 120 then detects 410 an attempt by the program to execute the code stored in the memory page. This detection occurs before the execution occurs, thus allowing the packing manager 120 to be notified when the program first tries to execute the dynamically generated content. The packing manager 120 performs this detection 410, in some embodiments, when a second exception is generated by a memory manager upon detection of the attempt by the program to execute the code. The packing manager 120 can again intercept the exception and take action. The packing manager 120 provides 412 to a malicious code detection module the memory page for analysis for the presence of malicious code. For example, the packing manager 120 can dump the process's address space image for the malicious code detection module to scan or otherwise perform an analysis for malware (e.g., using standard virus signature detection methods known in the art). If the malicious code detection module does not find any match in the dumped image, the program is permitted to continue its execution without further interruption. However, if the malicious code detection module detects malicious code in the program, then appropriate action can be taken to prevent this malicious code from harming the computer.

As explained above, some programs may be packed by more than one layer of packers. In some cases, there may be multiple layers of arbitrary packers of different types, some or all of which may not have been previously known (e.g., no signatures available). In some cases, the same packer may be applied more than once. Steps 402-412 can be repeated for each layer of packer, as explained above. When the original program is finally unpacked, the packing manager 120 will detect the point in time between the end of unpacking and the execution of the original program. Thus, if this program contains malicious code, this malicious code can be detected when the program is provided 412 for analysis. In other words, the packing manager 120 can refuse to execute any dynamically generated code without scanning first. Thus, at the finish of each layer of unpacking, but before execution, a scan will occur. In some embodiments, the scan occurs immediately after unpacking is concluded. However, it is also contemplated that additional steps could occur after unpacking ends but before execution, so the scanning can occur after these steps but still before execution.

Countermeasures for Possible Evasion Techniques

Embodiments of the invention described above prevent a host system from executing code that has been created dynamically before that code has been scanned to protect the host system against potential malicious code. However, these embodiments may rely on processes in a host computer system such as changing memory protections and handling memory access and execution exceptions. A malicious code programmer may attempt to exploit these in order to evade the basic detection and scanning techniques described.

For example, one feature used by an embodiment of the system is the ability to detect an attempt by a host system to execute code that has been dynamically created (i.e., created at runtime). In one embodiment, this is achieved by setting a memory page containing dynamically created code to be non-executable. To evade detection, therefore, malicious code may attempt to override this by changing the memory page with the dynamically created code to be executable. In this way, an unpacker can unpack malicious code, set the memory page to which the malicious code was written to be executable, and then pass the control to the malicious code so that it can infect the host system. By manually changing the memory page to be executable, this evasion technique avoids the execution access violation that would otherwise occur before the malicious code can be executed, thus bypassing the scanning of dynamically created code.

In accordance with one embodiment of the invention, a countermeasure is provided to prevent such an evasion tactic. The countermeasure involves preventing an unpacker routine from changing whether a memory page is executable. Instead, when an unpacker routine attempts to change a memory page from non-executable to executable, the system prevents this change from taking place. The system may also track the attempted change, so if the unpacker routine later queries the status of the page, the routine is told that that the memory page has been changed according to its request. This allows the unpacker routine to continue executing without encountering an error, but it also prevents the dynamically created code from being executed before it can be scanned.

If and when the control is subsequently passed to any code on that memory page, which the routine believes is executable, the execution access exception is triggered because the page is in fact marked as being non-executable. Accordingly, the memory page is scanned and if malicious code is not detected, the page is changed to be executable so the original program can continue. This process is described above, e.g., in connection with the method of FIG. 4.

Figure 5:
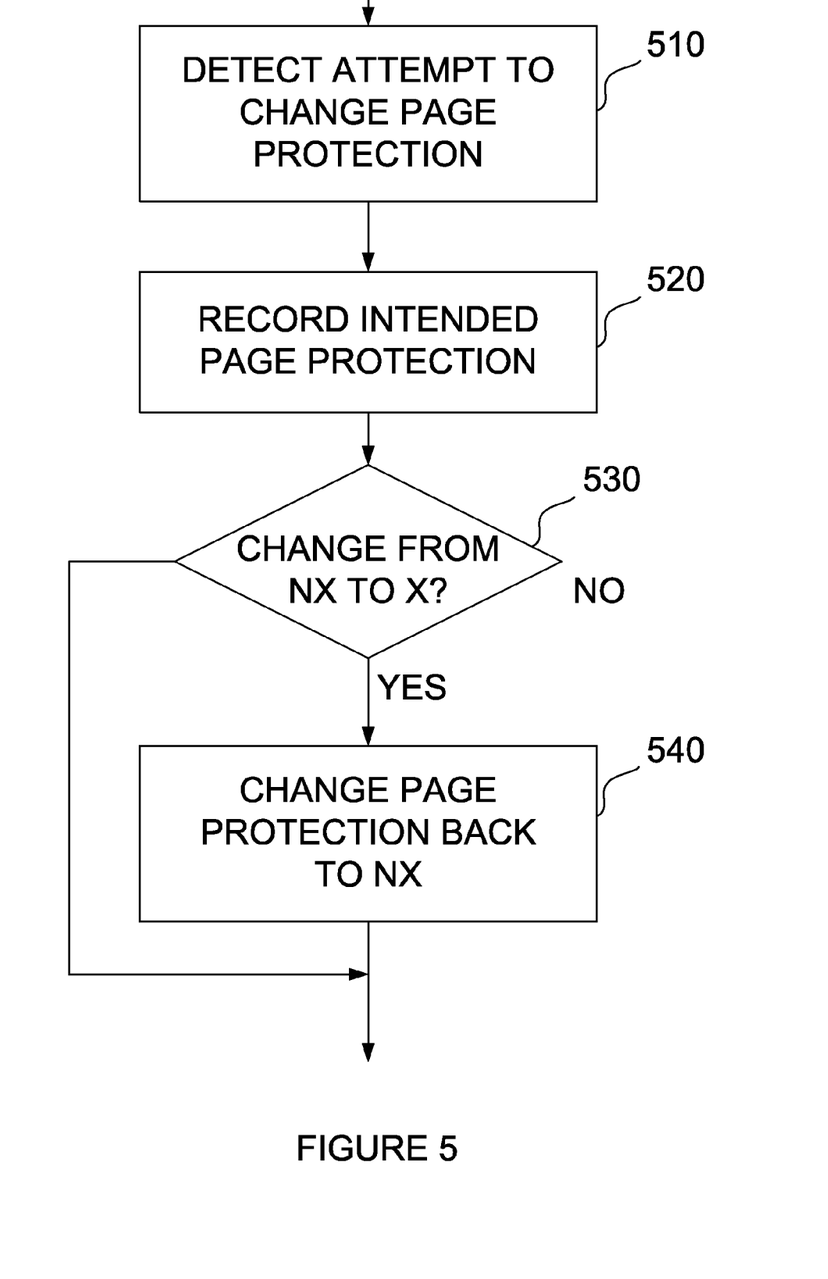
FIG. 5 is a flow diagram of a process for conducting a countermeasure for preventing an unpacker from overriding the execution exception, in accordance with one embodiment of the invention.

FIG. 5 illustrates one embodiment of the countermeasure for preventing an unpacker from overriding the execution exception. As FIG. 5 illustrates, this countermeasure procedure is triggered when the packing manager 120 detects 510 an attempt by a program to change the page protection of a memory page in the host computer system. The page protection may include whether the memory page is executable and/or whether the memory page is writable, as described above.

The packing manager 120 may detect 510 the attempt to change the page protection by intercepting a change in the page protection (e.g., if the packing manager 120 is designed to intercept and prevent a change in page memory). In a MICROSOFT® WINDOWS® system, for example, a program can control which memory pages are executable by using the VirtualProtect(Ex) API function. Accordingly, the packing manager 120 can determine when a program is attempting to change whether a memory page is executable by hooking this API. When the function is called, the packing manager 120 determines that the program is attempting to make a particular memory page executable, and it can then respond with the appropriate countermeasures as described herein.

When the packing manager 120 detects 510 an attempted change in the page protection of a particular memory page, the packing manager may also record 520 this intention. By keeping track of the page protection that the currently running program believes each memory page to have, the system can report back to the program this same information when the program asks for it (and otherwise act in accordance with that intended page protection). This helps avoids incompatibilities and errors that may otherwise result if the system merely refuses to allow the program to change page protection.

Depending on the change in the page protection requested by the program, the countermeasure may or may not need to be invoked. For example, if the program requested that the page protection be changed or set to be non-executable (NX), this action is not threatening because it would not evade the scanning of dynamically created code by the packing manager 120. However, an attempt to change the page protection to be executable (X) is threatening because that may be used to evade detection and scanning of dynamically created code by the packing manager 120. Accordingly, if 530 the attempted change is not from NX to X (executable), the countermeasure procedure can cease and the control returned to the program. However, if 530 the attempted change is from NX to X, this change is prevented. For example, the packing manager 120 may simply change 540 the page protection back to NX, while keeping track that the program thinks the page protection is set to X. Once this countermeasure has been taken, the control can be returned to the program for further execution.

Another issue that may arise with certain embodiments of the packing manager 120 described herein is enforcing the execution and writing mutual exception when a program attempts to write to the same memory page where the current instruction resides. As described above, the packing manager 120 in one embodiment enforces a write and execution mutual exclusion so that a memory page may be either writable or executable, but not both. However, this mutual exclusion poses a problem when a memory page contains executable code that attempts to write to the same memory page. This activity may be less suspicious, as it is not the typical activity of a malware unpacker, but it still leads to possible errors when the packing manager 120 attempts to enforce the mutual exclusion. For example, enforcing the mutual exclusion would mean that the writing does not take place or the execution is disallowed.

Figure 6:
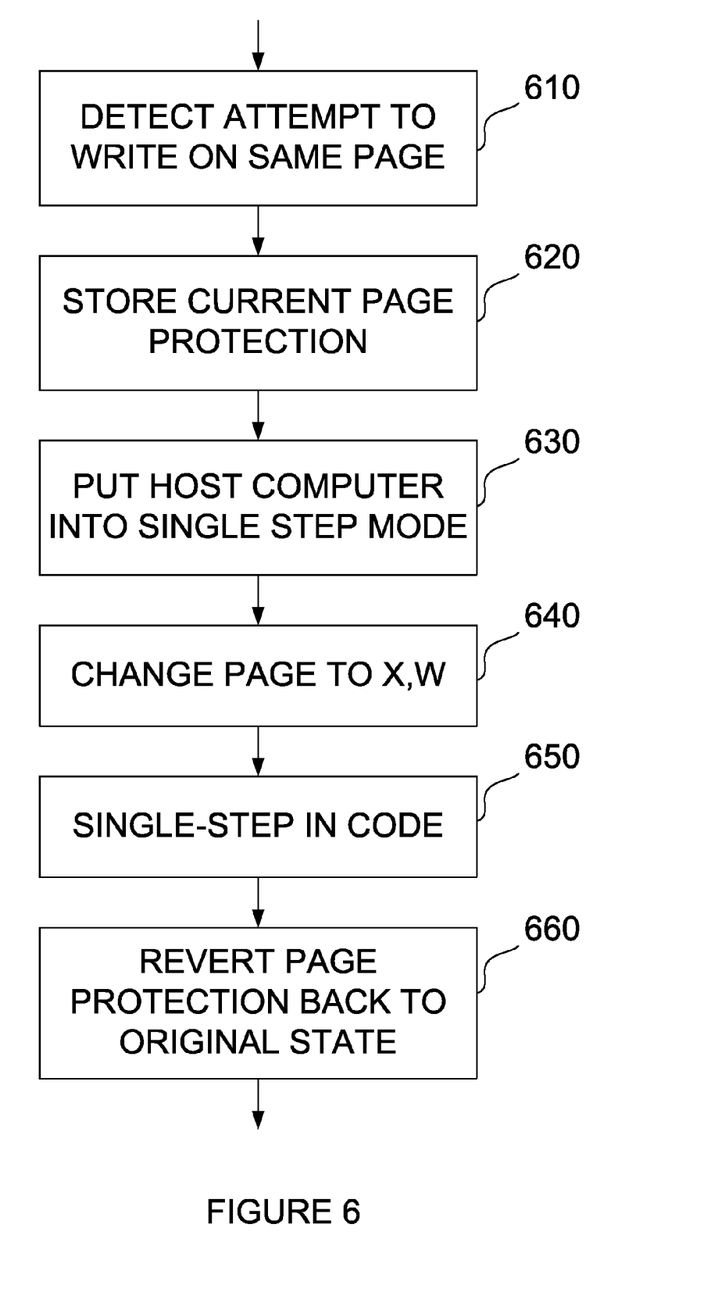
FIG. 6 is a flow diagram of an exception handler process for enforcing a write and execution mutual exclusion when a program attempts to write to a memory page containing the program's code, in accordance with one embodiment of the invention.

One solution to this problem is to allow a memory page temporarily to be both writable and executable. In one embodiment, this exception to the mutual exclusion rule is made temporary by putting the host computer's processor into a single step mode, where the packing manager 120 allows the program to make a single step through its code before the packing manager regains control. FIG. 6 illustrates one embodiment of this procedure.

This process is triggered when the packing manager 120 detects 610 an attempt by the program running to write to the same memory page that contains the program code that is being executed. This causes a write exception to be generated, which the packing manager 120 cannot resolve by making it writable but not executable (as described above in connection with FIG. 4). Instead, the packing manager 120 stores 620 the current page protection (e.g., executable, but not writeable) and then puts 630 the host computer system into a single step mode. Then, the packing manager changes 640 the page protection for the memory page to be both writable and executable. The control is then passed back to the program, which single-steps 650 the current instruction (i.e., the write operation that initially generated the write exception). Once the instruction is performed, the single step exception is generated, and the packing manager 120 regains control of the system. Now that the write operation has been executed, the write and execution mutual exclusion for the memory page can be enforced again. Accordingly, the packing manager 120 reverts 660 the page protection for the memory page back to its original state (e.g., executable, but not writable). In this way, the program is allowed to continue, but the system is protected from dynamically created malicious code.

The following is an example of pseudo code that might be implemented to perform the process of FIG. 6. This code may be implemented, for example, in one or both of the exception handlers 306 and 312 shown in FIG. 3.

```
{
    if write exception and the original protection setting is writable
        change page to be writable but not executable
    if the current instruction is on the same page as the write destination
        change page to be writeable and executable
        set single step flag
    if single step exception
        change page to be executable but not writeable
        clear single step flag
    if others
        pass the exception to the program
}
```

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer program product for protecting a host computer system against dynamically unpacked malicious code, the computer program product comprising a non-transitory computer-readable storage medium containing executable computer program code for:
   detecting an attempt by a program to write to a memory page on the host computer system;
   responsive to detecting the attempt to write to the memory page, marking the memory page to be writable but non-executable to allow the program to write to the memory page;
   detecting a request from the program to change the memory page to be executable;
   preventing the memory page from being changed to be executable responsive to detecting the request from the program;
   detecting an attempt by the program to execute code written to the memory page by the program, the execution attempt distinct from the request from the program to change the memory page to be executable;
   responsive to detecting the attempt to execute code on the memory page, before executing the code on the memory page, scanning the memory page for malicious code; and
   marking the memory page to be executable if the scanning does not find malicious code on the memory page.

2. The computer program product of claim 1, wherein preventing the memory page from being changed to be executable comprises:
   after the memory page is changed to be executable, reversing the change to make the memory page non-executable.

3. The computer program product of claim 1, the non-transitory computer-readable storage medium further containing computer program code for:
   recording an intended page protection for the memory page as being executable responsive to detecting the request from the program to change the memory page to be executable, although a page protection for the memory page is non-executable.

4. The computer program product of claim 3, the non-transitory computer-readable storage medium further containing computer program code for:
   responsive to an inquiry from the program about the page protection of the memory page, responding to the program with the intended page protection of executable although the page protection for the memory page is non-executable.

5. The computer program product of claim 1, wherein detecting the attempt to write to the memory page comprises intercepting a first exception generated by a memory manager when the program attempts to write to the memory page, the memory page set to be executable but not writable.

6. The computer program product of claim 1, wherein detecting the attempt to execute code written to the memory page comprises intercepting a second exception generated by a memory manager when the program attempts to execute the code written to the memory page by the program, the memory page set to be writable but not executable.

7. The computer program product of claim 1, the non-transitory computer-readable storage medium further containing computer program code for:
   keeping the memory page as being non-executable if the scanning identifies malicious code on the memory page.

8. The computer program product of claim 1, the non-transitory computer-readable storage medium further containing computer program code for:
   declaring an existence of malicious code if the scanning identifies malicious code on the memory page.

9. The computer program product of claim 1, wherein scanning the memory page for malicious code comprises analyzing the memory page using a set of known signatures for malicious code.

10. A computer-implemented method for protecting a host computer system against dynamically unpacked malicious code, the method comprising:
    detecting an attempt by a program to write to a memory page on the host computer system;
    responsive to detecting the attempt to write to the memory page, marking the memory page to be writable but non-executable to allow the program to write to the memory page;
    detecting a request from the program to change the memory page to be executable;
    preventing the memory page from being changed to be executable responsive to detecting the request from the program;
    detecting an attempt by the program to execute code written to the memory page by the program, the execution attempt distinct from the request from the program to change the memory page to be executable;
    responsive to detecting the attempt to execute code on the memory page, before executing the code on the memory page, scanning the memory page for malicious code; and
    marking the memory page to be executable if the scanning does not find malicious code on the memory page.

11. The computer-implemented method of claim 10, further comprising:
    recording attempts by the program to change whether a portion of the memory page is executable.

12. The computer-implemented method of claim 10, wherein detecting the attempt by the program to write to the memory page comprises:
    setting the memory page to be not writeable; and
    intercepting an exception when the program attempts to write to the memory page.

13. The computer-implemented method of claim 10, further comprising:
    keeping the memory page as being non-executable if the scanning identifies malicious code on the memory page.

14. The computer-implemented method of claim 10, further comprising:
    declaring an existence of malicious code if the scanning identifies malicious code on the memory page.

15. The computer-implemented method of claim 10, wherein scanning the memory page for malicious code comprises analyzing the memory page using a set of known signatures for malicious code.

16. A computer program product for protecting a host computer system against dynamically unpacked malicious code, the computer program product comprising a non-transitory computer-readable storage medium containing executable computer program code for:
    enforcing a mutual exclusion requirement for a set of memory pages on the host computer system, the mutual exclusion requirement requiring that each of the set of memory pages cannot be both executable and writeable at the same time;

executing a set of instructions for a program contained on a first memory page of the set of memory pages, a page protection of the first memory page set to be executable but not writeable, wherein the set of instructions includes a write instruction to write to the first memory page;

setting a single step execution before passing control to the program;

changing the page protection of the first memory page to be writeable and executable to allow the write instruction to be executed;

passing control to the program to execute the write instruction;

intercepting the single step execution after the write instruction is executed by the program; and changing the page protection of the first memory page to be executable and not writable after the write instruction is executed.

17. The computer program product of claim 16, the non-transitory computer-readable storage medium further containing computer program code for:

scanning any dynamically created code on the memory pages before executing the dynamically created code.

18. The computer program product of claim 17, wherein scanning any dynamically created code on the memory pages before executing the dynamically created code comprises:

detecting an attempt to execute code on a particular memory page;

responsive to detecting the attempt to execute code on the memory page, before executing the code on the memory page, scanning the memory page for malicious code; and marking the memory page to be executable if the scanning does not find malicious code on the memory page.

19. The computer program product of claim 18, wherein scanning the memory page for malicious code comprises analyzing the memory page using a set of known signatures for malicious code.

\* \* \* \* \*